Oct. 8, 1963 H. O. McMAHON ETAL 3,106,648
SUPERCONDUCTIVE DATA PROCESSING DEVICES
Filed May 27, 1960 6 Sheets-Sheet 1

INVENTORS
HOWARD O. McMAHON
ALBERT E. SLADE
BY
Blair & Spencer
ATTORNEYS.

Oct. 8, 1963  H. O. McMAHON ETAL  3,106,648
SUPERCONDUCTIVE DATA PROCESSING DEVICES
Filed May 27, 1960  6 Sheets-Sheet 3

INVENTORS
HOWARD O. McMAHON
BY ALBERT E. SLADE

*Blair & Spencer*

ATTORNEYS.

Oct. 8, 1963  H. O. McMAHON ETAL  3,106,648
SUPERCONDUCTIVE DATA PROCESSING DEVICES
Filed May 27, 1960  6 Sheets-Sheet 5

INVENTORS
HOWARD O. MCMAHON
ALBERT E. SLADE
BY
Blair & Spencer
ATTORNEYS.

Oct. 8, 1963 H. O. McMAHON ETAL 3,106,648
SUPERCONDUCTIVE DATA PROCESSING DEVICES
Filed May 27, 1960 6 Sheets-Sheet 6

INVENTORS
HOWARD O. McMAHON
ALBERT E. SLADE
BY
Blair, Spencer & Buckles
ATTORNEY United States Patent Office 3,106,648
Patented Oct. 8, 1963

3,106,648
SUPERCONDUCTIVE DATA PROCESSING DEVICES
Howard O. McMahon, Lexington, and Albert E. Slade, Cochituate, Mass., assignors to Arthur D. Little, Inc., Cambridge, Mass.
Filed May 27, 1960, Ser. No. 33,357
38 Claims. (Cl. 307—88.5)

This invention relates to an improved construction for data processing devices. More particularly, it relates to an improved construction for memories, multiple-position switches, translators, or the like in which conductors are caused to transfer between a superconductive and resistive state under the influence of the magnetic field caused by current flowing in other conductors in close proximity thereto.

The present application is a continuation-in-part of our co-pending applications Serial No. 659,039, filed May 14, 1957, and Serial No. 743,914, filed June 23, 1958, which are now abandoned.

Figure 1:
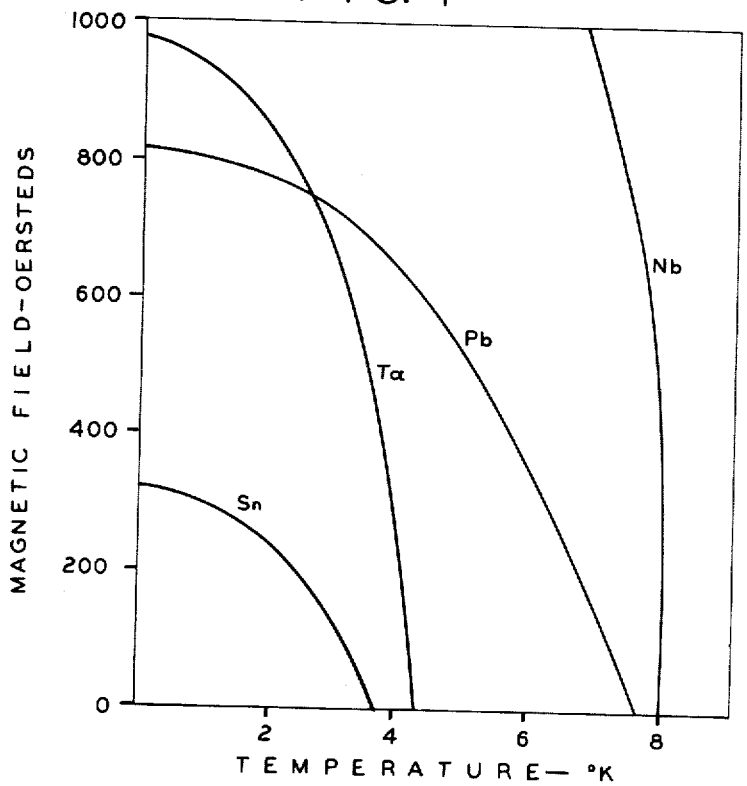
Figure 2:
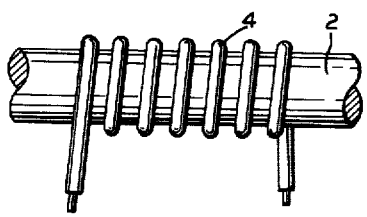
Figure 3:
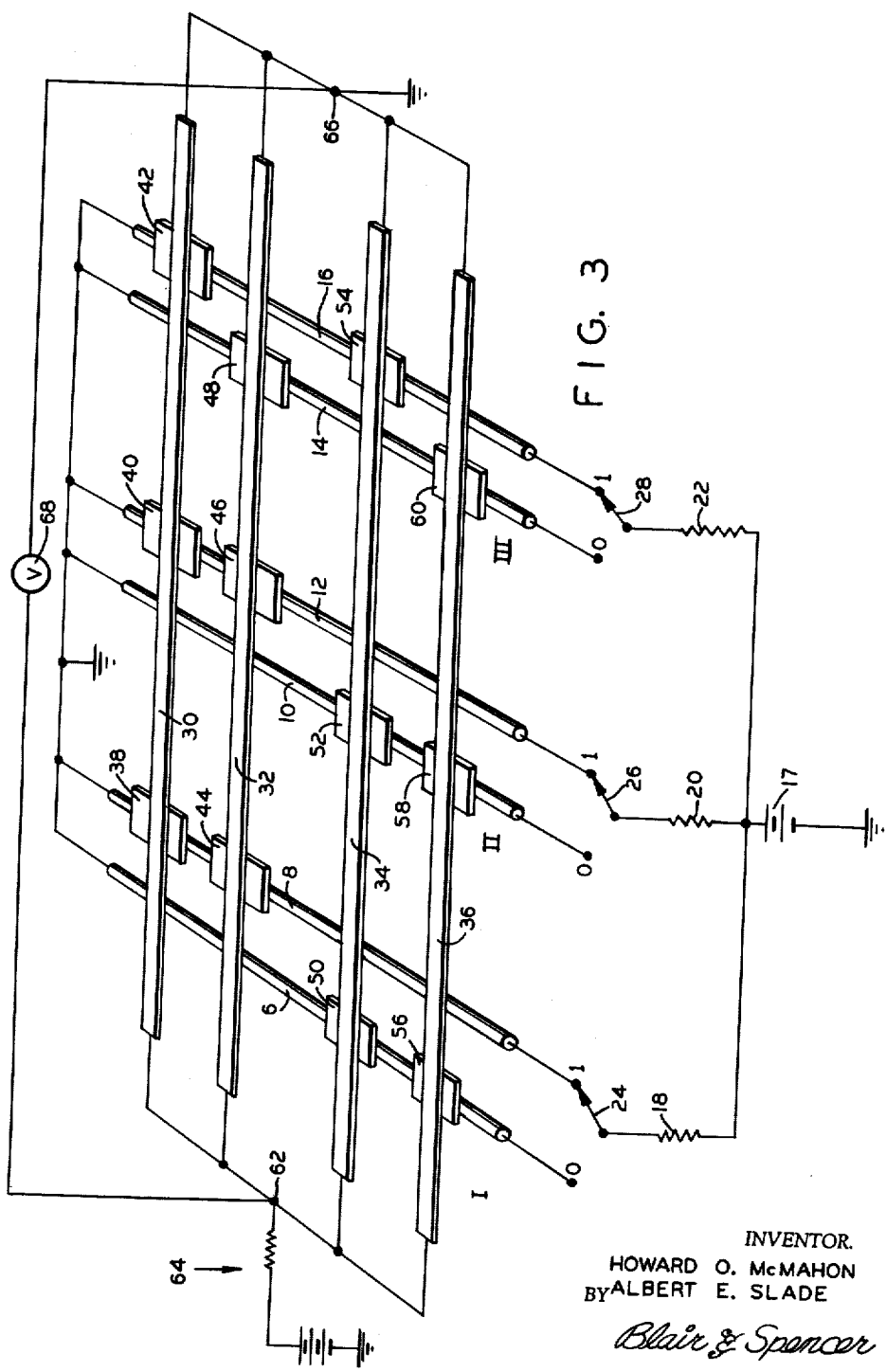
Figure 4:
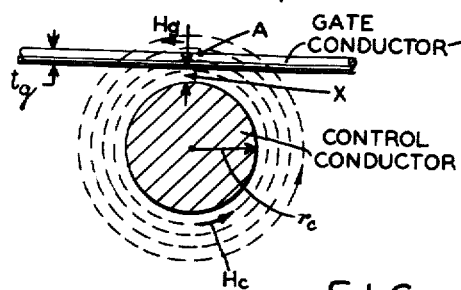
Figure 5:
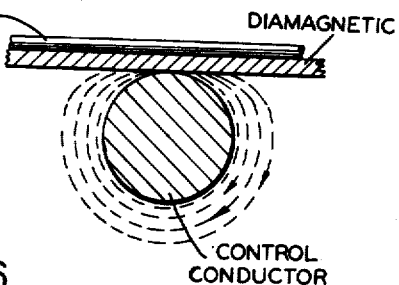
Figure 6:
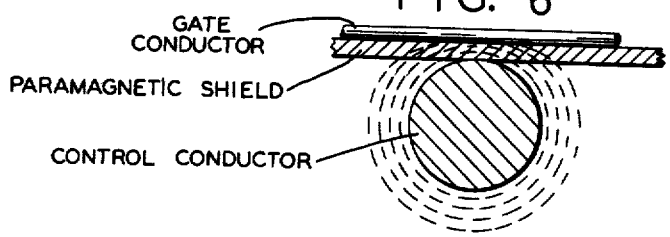
Figure 7:
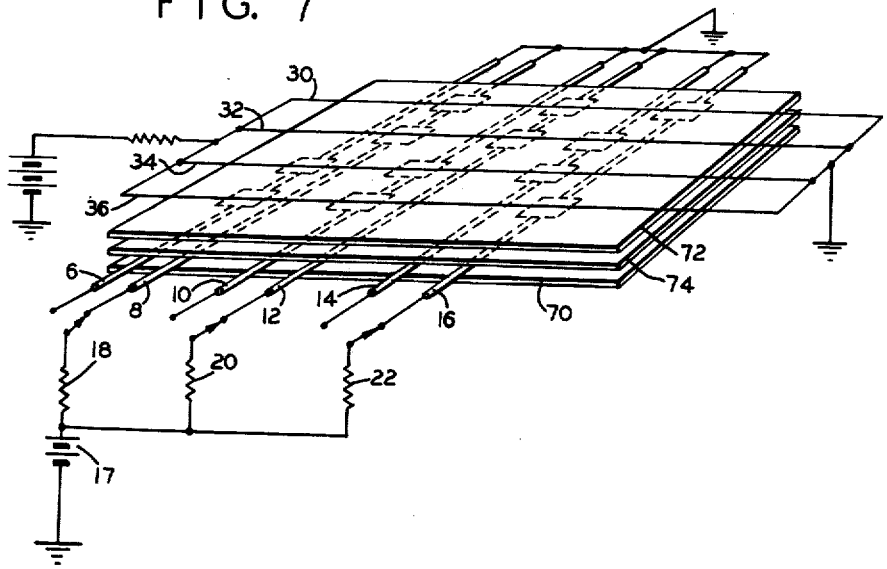
Figure 8:
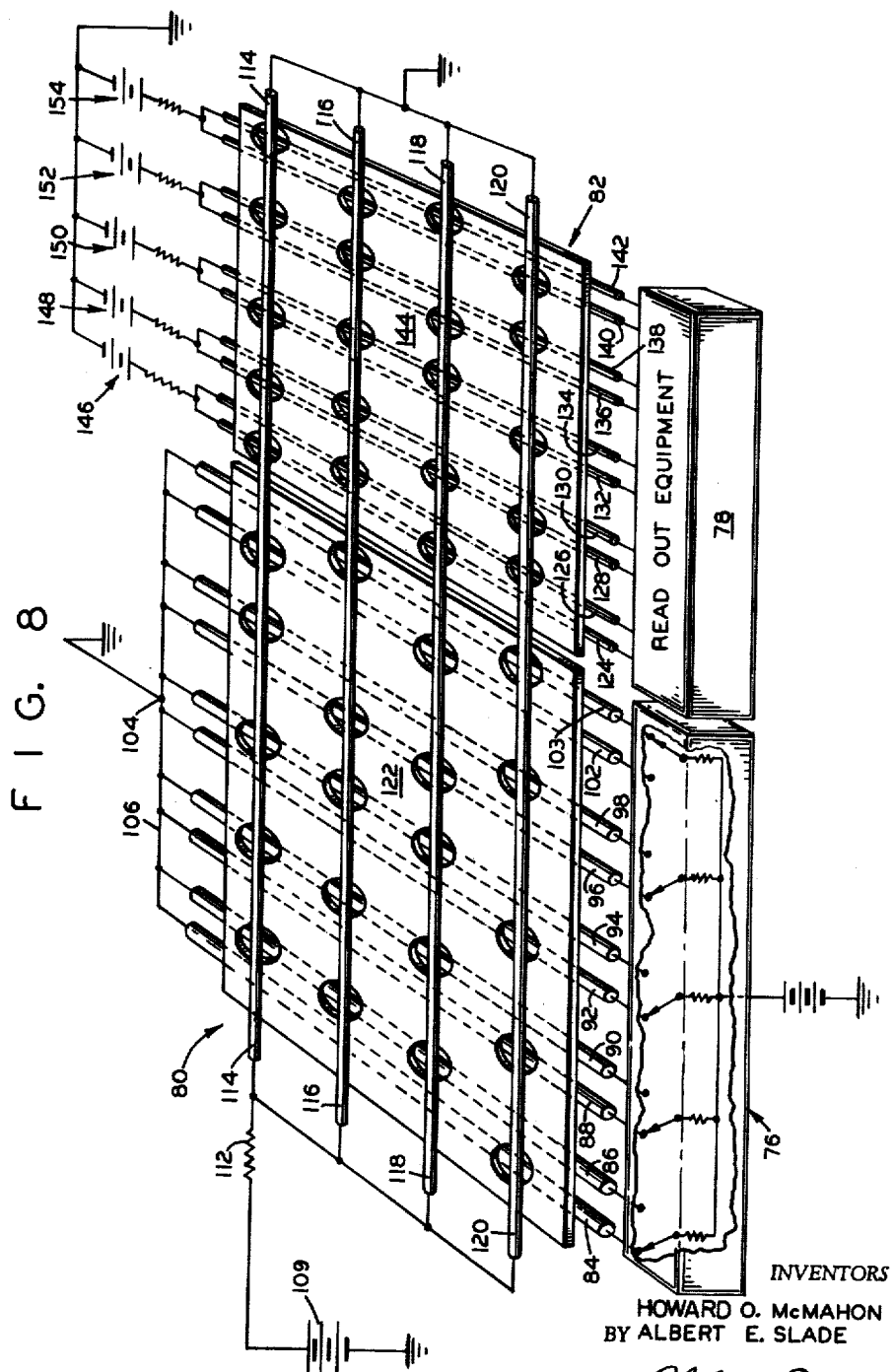
Figure 9:
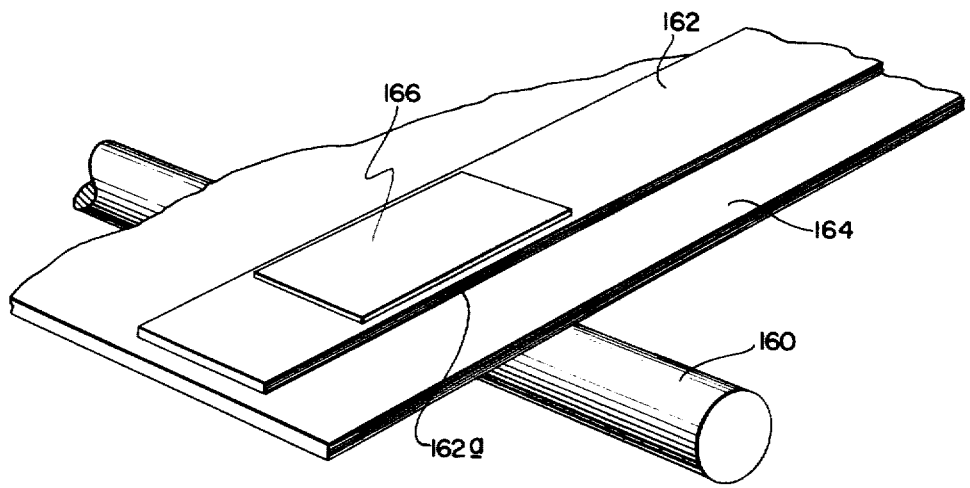
Figure 10:
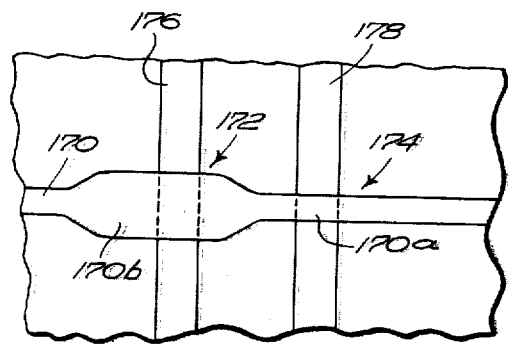
Figure 11:
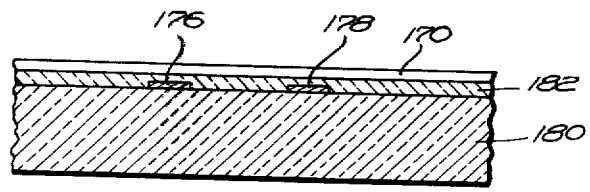

The construction and operation of our computing elements may best be understood from the following description taken with the accompanying drawings in which:

FIGURE 1 is a family of curves for different materials showing how the temperatures at which certain materials become superconductive change as a function of applied magnetic field, FIGURE 2 is a diagrammatic representation of a typical individual cryotron computing element, FIGURE 3 is a diagrammatic representation of a memory made according to our invention, FIGURE 4 illustrates the magnetic flux pattern at the crossing of an unshielded gate and control conductor due to current in the control wire, FIGURE 5 illustrates the magnetic flux pattern at the crossing of a gate conductor and a control conductor when the gate conductor is shielded by a diamagnetic shield, FIGURE 6 illustrates the magnetic flux pattern at the crossing of a gate conductor and a control conductor when the control conductor is shielded by a paramagnetic shield, FIGURE 7 is a diagrammatic representation of a memory utilizing our invention in which the control conductors, gate conductors and shields are imbedded in plastic sheets, FIGURE 8 is a diagrammatic representation of a translator for converting one set of digits to another set of digits utilizing our invention, FIGURE 9 is an enlarged diagrammatic representation showing how another embodiment of our invention may be used to overcome the effect of control conductor current at a control conductor-gate conductor crossover, FIGURE 10 is a fragmentary plan view of a data processing device incorporating still another embodiment of our invention, and FIGURE 11 is a side elevation, partly in section, of the embodiment of FIGURE 10.

Switching elements useful in data processing devices have been developed which depend for their operation on the changes in properties of certain electrical conductors when subjected to temperatures approaching absolute zero. In the absence of a magnetic field, these materials change suddenly from a resistive state to a superconductive state in which their resistance is identically zero as their temperature approaches absolute zero. The temperature at which this change occurs is known as the transition temperature. When a magnetic field is applied to the conductor, this transition temperature is lowered, the relationship between applied magnetic field and transition temperature for certain specific materials being shown in FIGURE 1. As shown therein, in the absence of a magnetic field, tin loses all electrical resistance when reduced to a temperature of 3.7° K. or below, tantalum does so at 4.4° K., lead at 7.2° K., and niobium at 8° K. In all, there are about 21 elements in addition to many alloys and compounds which undergo transition to the superconductive state at temperatures ranging between 0 and 17° K. The presence of a magnetic field causes the normal transition temperature to move to a lower value, or if a constant temperature is maintained, a magnetic field of sufficient intensity will cause the superconductive material to revert to its normal resistive state. From FIGURE 1 it may be seen that a magnetic field of about 100 oersteds will cause a tantalum wire held at 4.2° K. (the temperature of liquid helium at atmoshperic pressure) to change from a superconductive to a resistive state.

The cryotron is an individual circuit element which makes use of the shift between the superconductive and normal resistive states of these materials when held at constant temperatures. A typical individual cryotron unit is illustrated in FIGURE 2 and includes a central or gate conductor 2 and a coil 4, both the gate conductor and the coil being of materials which are normally superconductive at depressed temperatures. In operation, the entire unit is cooled to a temperature at which the gate conductor 2 and the control conductor 4 becomes superconductive. This cooling can be conveniently accomplished, for example, by immersing the unit in a liquid helium bath which has a temperature of 4.2° K. at normal pressure. If a current of sufficient magnitude is applied to the control coil, the magnetic field produced thereby will "quench" the gate conductor, i.e., cause it to transfer from a superconductive to a resistive state. Thus, the control coil and gate wire form an electrically operated switch which can be changed from a superconductive to a resistive state by the application of current to the control coil.

In cryotrons of the type illustrated, tantalum is the preferable material for gate conductors since its transition temperature in the 50 to 100 oersted region is 4.2° K., the boiling point of helium at atmospheric pressure. This temperature is attainable without the use of complicated pressure or vacuum equipment for raising or lowering the temperature of helium. Niobium, which has a relatively high quenching field (the field strength required to render a superconductive material resistive), is usually used as the material for the control coil, since it is desirable, and in many cases necessary, that the control conductor remain superconductive through the operation of the cryotron, and this coil is subjected to substantially the same magnetic fields as those imposed on the gate conductor.

In addition to exceedingly small size, cryotrons have the advantage of low power dissipation. Thus, the cryotron is well suited for use as a basic element in data processing devices such as digital computers, and various computer circuits such as flip-flops, etc., have been designed incorporating this element.

In many data processing applications it is desirable to control the conductivity of more than a single conducting path. For example, pulse distributors, control switches, translators and memory circuits may require several controlled conducting paths connected to a common input. In multiple conducting path data processing devices, herein termed multiple gate devices, which utilize cryotrons, the conductive state of a plurality of gate wires is controlled by a plurality of control conductors. A plurality of individual cryotrons of the type illustrated in FIGURE 2 may be used to make such multiple gate devices, in which case the superconductive control coils are usually connected together in series. The gate conductors of the individual cryotrons are also connected in series to form the gate wires of the device.

It has been proposed to make multiple gate devices by using a "rope" construction. The strands of the "rope" are made from fine wire which is superconductive at the temperature of use and becomes resistive under the influence of current carried in control coils. In computers using the binary numbering system, the control coils are usually arranged in pairs at each of several control stations, each coil encircling approximately half the strands in the rope; each strand is thus associated with one or the other of the control coils at each control station. By using a plurality of control stations and selectively energizing one or the other of the control coils at each station, a single superconductive strand can be selected from all of those which make up the "rope." As disclosed in the co-pending application of Dudley A. Buck entitled "Multiple Gate Cryotron Swith," filed February 19, 1957, Serial No. 640,656, now Patent No. 2,959,688, this construction may be utilized for a multiple gate switch, or as disclosed in the co-pending application of Albert E. Slade entitled "Prewired Cryotron Memory," filed March 13, 1957, Serial No. 645,776, now Patent No. 3,001,179, it may be utilized in a computer memory. While this construction is satisfactory, and in many cases desirable, for multiple gate units, there is a need for simple construction for such devices which is susceptible of low-cost manufacture, preferably by automatic machinery.

Since an individual superconductive switch, i.e., a cryotron, is extremely small in size, one of its primary advantages is small volume for a given number of computing elements. Similarly, multiple gate data processing devices to be used with cryotron computers should be so constructed that large numbers of individual gated elements, for example, of the order of a million, may be selectively controlled, while yet occupying a relatively small space to preserve the size advantages of a cryotron computer. Another problem, especially in memories of the type described, is to change the information stored therein. With as many as a million fine strands of wire in a rope, it is difficult to add or remove individual wires, especially if the strands are closely packed. Similarly, in translators it is sometimes desirable to change the translation, i.e., to obtain a different output for a given input. Where such changes are to be made frequently, it is not possible to utilize the rope construction, other than by substituting a complete translator.

Our construction, to be hereinafter described, provides multiple gate data processing devices which overcome these and other problems which are present in certain applications of prior constructions and provides other advantages which will be readily apparent.

Accordingly, it is a principal object of our invention to provide an improved construction for multiple gate data processing devices utilizing cryotron principles.

A more specific object of our invention is to provide an improved construction of the type described which is simple and susceptible of machine manufacture.

Another object of our invention is to provide a construction which is adapted to permit control of large numbers of gate conductors in a relatively small space.

Another object of our invention is to provide a construction of the type described which readily permits changing the information stored in a memory, or the input-output relationship in a translator.

Another object of our invention is to provide a multiple gate memory utilizing our improved construction.

A further object of our invention is to provide a multiple position switch made according to our invention.

A still further object of our invention is to provide a translator for converting a set of input data to a different set of output data utilizing our improved construction.

A still further object of our invention is to provide a translator in which all output signals appear simultaneously.

A still further object of our invention is to provide a construction for multiple gate data processing devices of the type described which minimizes the many connections between materials which are required when a plurality of individual cryotron units are utilized to make such devices.

Yet another object of our invention is to provide a construction for data processing devices of the type described which is economical and rugged.

Other and further objects of the invention will in part be obvious and will in part appear hereinafter.

Our invention accordingly comprises the features of construction, combinations of elements, and arrangements of parts which will be exemplified in the constructions hereinafter set forth, and the scope of the invention will be indicated in the claims.

A simplified memory for use data processing devices utilizing the binary number system and made according to our invention is illustrated in FIGURE 3. As shown therein, six control conductors 6, 8, 10, 12, 14 and 16 are arranged in pairs to form control stations I, II and III. Either control conductors at each station may be energized from the current sources formed by battery 17 and resistors 18, 20 and 22, depending on the positions of the switches 24, 26 and 28. If the left-hand control conductor at each station is chosen as the ZERO conductor and the right-hand conductor as the ONE conductor, these control conductors may be energized according to a binary code, each digit in a binary "word" corresponding to one control station. Thus, in FIGURE 3 the control conductors are being energized according to the word 111.

Preferably, a plurality of superconductive gate conductors 30, 32, 34 and 36 whose conductive states are controlled by the control conductors are physically spaced from and extend at right angles across the control conductors. The materials, spacing and size of the gate and control conductors are so chosen that when a current of sufficient magnitude is carried by the control conductor, it will "quench," i.e., make resistive, a gate wire crossing immediately above it in the same manner that the control coil 4 of FIGURE 2 quenches the gate conductor enclosed therein.

In order to select one superconductive gate conductor from the four shown in FIGURE 3, three magnetic shields may be associated with each gate conductor. Thus, shields 38, 40 and 42 are associated with gate conductor 30, shields 44, 46 and 48 with conductor 32, shields 50, 52 and 54 with conductor 34, and 56, 58 and 60 with conductor 36. One shield may be located at each control station between the gate conductor and one or the other of the control conductors. These shields prevent the flux resulting from the magnetic field surrounding the current carrying control conductors from quenching the gate conductors passing immediately above them. Thus, since shields 38, 40 and 42 are located between the ONE control conductor and the gate conductor 30 at each station, gate 30 will remain superconductive when the switches 24, 26 and 28 are positioned to feed the word 111 into the memory. However, none of the other conductors will remain superconductive under these conditions; gate conductor 32 will be quenched by the ONE conductor 16 of station III, conductor 34 by the ONE conductors 8 and 12 of stations I and II, and conductor 36 by all three ONE conductors. By suitably changing the arrangement of the switches 24, 26 and 28, the other gate conductors can similarly be made superconductive, one at a time. For example, gate conductor 32 will remain superconductive and conductor 30 be quenched if switch 28 is thrown from the position shown in FIGURE 3 to its other position where it is energizing ZERO control conductor 14. Each gate conductor may be labeled according to the combination of input digits which leaves it in the superconductive state. Thus gate conductor 32 may be termed the 110 conductor, gate 36 the 000 conductor, and so on.

It will be observed that, of the eight possible combinations of three binary digits, only four are represented by gate conductors in the memory. It is this omission which makes the device illustrated in FIGURE 3 a memory element. Thus, the left ends of the gate conductors are connected to a common point 62 via superconductive wires, and this point is connected to a single current source generally indicated at 64. In a similar fashion, the right-hand ends are connected to a common point 66 and from there to ground. If a combination of digits, i.e., a word, is fed to the control conductors for which there is a gate conductor in the memory, that conductor will remain superconductive, while all other conductors in the memory become resistive. All the current from the current source 64 will thus pass from the point 62 to the point 66 via a superconductive path, and there will be no voltage drop across the memory, as indicated by a voltage responsive device such as voltmeter 68 connected between these points.

If a conductor corresponding to the input word is not in the memory, then all conductors in the memory will become resistive, and the current from source 64 will divide among them inversely according to their resistances. Thus current, in passing through the memory, will cause a voltage drop across it which will be indicated by the meter 68. Thus, the presence of a voltage indicates that the particular word fed to the memory is not stored therein.

With "$n$" control stations, each station having a single pair of control wires, it is possible to select one out of $2^n$ gate conductors. However, there will seldom be more than $2^{n-1}$ gate wires in an "$n$" control station memory. This can be explained as follows: assume that it is desired to store X words out of a total of $2^n$ possible words in the prewired memory, and X is less than half of the possible words, i.e., $X<2^{n-1}$. Then a wire may be inserted in the memory for each of the X words. A superconducting path through the memory will then indicate that a given word is stored therein as described. However, of X is more than half the possible words, i.e., $X>2^{n-1}$, then a wire may be inserted for each of the combinations of input signals for which there is no word in the X class of words. A superconducting path through the memory then means that the input word is not one of the class of stored words. In this fashion, the number of wires in a prewired memory may be substantially minimized.

In practice, the gate wires and the connecting wires in the memory of FIGURE 3 are made superconductive by placing the entire memory in a liquid helium bath. To avoid the necessity of sealing the bath and using pressure regulating equipment, the bath is preferably maintained at atmospheric pressure with a resulting bath temperature of substantially 4.2° K. The gate conductors and the wires connecting them to common points should be superconductive; it is not necessary, however, although it may be desirable, that the control conductors be superconductive at this temperature.

If the control conductors are superconductive, it is preferable that they be made of a material requiring a higher quenching field at the temperature of operation than the gate wires. Thus, if the gate wires are of tantalum, niobium or lead will be satisfactory for the control wires. They should also be substantially larger than the gate conductors, as hereinafter explained. Since magnetic shields, which are usually electrical conductors, are inserted between the control and gate wires and may touch both of them, the control wires are coated with an electrically insulating coating which is preferably as thin as possible. Such a coating may be made by sintering a coating of about 0.005 inch of polytetrafluoroethylene thereon, for example, or enameled wire may be used. While we have illustrated the control conductors as circular wires, they may have any desirable cross sectional shape, such as square or rectangular.

Gate wires 30, 32, 34 and 36 are preferably, although not necessarily, at right-angles to the control wires. This minimizes the effect of the self-field generated by current in the gate wires on the control field, and any interaction between the fields will be independent of the relative directions of current flow in these conductors. The gate conductors are made of a material having a lower quenching field at the temperature of operation than that of the control conductors if the control conductors are superconductive. This permits the gate wires to be quenched by the magnetic field produced by control current in the control conductors, and yet prevents self-quenching of the control conductors themselves. If, for example, niobium is used as the material for the control conductors, lead or tantalum might be used for the gate conductors. In addition to the reasons given hereinafter, if the gate conductors are small with respect to the control conductors, their resistances will be relatively large when in the resistive state. Thus, when a plurality of gate conductors are in parallel and all are resistive, there will still be a measurable voltage across them. Conductors of between 0.001 and 0.003 inch in thickness, or in the event that the conductors are circular in cross section, of this diameter are preferred although other sizes may be utilized. Thin ribbons rather than circular conductors may be used for gate conductors, and the conductors illustrated in FIGURE 3 are of this type. Both the gate wires and the ribbons may be made of solid material such as lead or tantalum, or they may be made of an insulating material such as plastic or glass or a resistive metal such as stainless steel, the insulating or resistive materials being covered with a thin film of superconductive metal. This will substantially increase the resistance of a quenched gate conductor. If the control conductors are insulated as previously described, it is not necessary to insulate the gate conductors; however, if the insulation on the control wires is not dependable, it may be desirable to use insulated wire or ribbon for the gate conductors also.

As has been mentioned, the relative size of the control and gate conductors is important to secure proper operation of multiple gate devices made according to our improved construction. This can be explained by reference to FIGURE 4, which illustrates a typical crossing of a control and gate conductor, the control conductor being shown in cross section and assumed to be circular.

As shown therein, the control wire has a radius $r_c$, and the gate wire is a ribbon having a thickness $t_g$. (If the gate wire is circular, its radius will be $$\frac{t_g}{2}.)$$

The space between the control and gate wires is defined as having the value $x$. When a current I flows in the control conductor, the magnetic field at the surface of the control wire $H_c$ will be given by the equation:

$$H_c = \frac{I}{2r_c}$$

Similarly, the magnetic field at the point A on the far surface of the gate wire where it crosses the control wire $H_g$ will be:

$$H_g = \frac{I}{2r_2}$$

where $$r_2 = r_c + x + t_g$$

When the gate conductor is to be quenched by current in the control conductor, $H_g$ must be greater than or at least equal to $H_g^*$, the field required to quench the gate wire, and $H_c$ must be less than $H_c^*$, the field required to quench the control conductor if the control conductor is superconductive. Accordingly, $$\frac{I}{2r_2} > H_g^*$$

and $$\frac{I}{2r_c} < H_c^*$$

If the field intensity $$H_g = H_g^*$$

i.e., the minimum field required to quench the gate conductor, is present at the point A, then the field at the surface of the control conductor, $$H_c = \frac{H_g^* r_2}{r_c} < H_c^*$$

and $$\frac{r_2}{r_c} < \frac{H_c^*}{H_g^*}$$

Substituting for $r_2$, this becomes:

$$\frac{r_c + x + t_x}{r_c} < \frac{H_c^*}{H_g^*}$$

and $$r_c > \frac{r_c + x + t_x}{\frac{H_c^*}{H_g^*}}$$

The ration of quenching fields on the right-hand side of this inequality depends upon the materials chosen, and, in a typical case, if lead is chosen for the control conductors and tantalum for the gate conductors at a temperature of 4.20° K., the ratio, from FIGURE 1, will be approximately:

$$\frac{550 \text{ oersteds}}{100 \text{ oersteds}} = 5.5$$

Thus, in the limiting case, where the field at the outer surface of the gate conductor is just sufficient to quench it through its thickness:

$$r_c > \frac{r_c + x + t_x}{5.5}$$

or $$r_c > \frac{x + t_g}{4.5}$$

and $$t_g < 4.5 r_c - x$$

It must be kept in mind that this is the limiting case, i.e., that only the portion of the gate wire falling within a circle of radius $r_2$ will be made resistive, and that this circle touches the outer surface of the gate conductor only at the point A; also, the field at the surface of the control conductor will be just less than the field required to quench the control conductor.

To quench a substantial length of the gate conductor for greater electrical resistance thereof while maintaining the field at the surface of the control conductor within reasonable limits, it is desirable to multiply one side of the inequality by some "safety" factor. We have selected the value 10 for this factor, and, thus:

$$t_g < .45 r_c - .1x$$

Thus, the thickness of the conductor should not be more than about one-half the radius of the control conductor less one-tenth the spacing between the conductors for a lead-tantalum construction at 4.2° K., if reliable operation is to be assured and a substantial portion of the gate wire is to be quenched. It can be seen from this equation that $x$, the spacing between the control and gate conductors, should be kept as small as possible to minimize the ratio of control conductor radius to gate conductor thickness. Thus, if $x$ is 1 mil and the radius of the control conductor is 2 mils, the permitted gate thickness drops to about .8 mil. If the gate is a round wire, the relative radii of gate and control wires would be about 1/5 in this instance. If $x$ is $\frac{1}{10} r_c$ or less, its effect on the ratio of gate to control size is negligible, the ratio having a value of about ½ in the limiting case where $x=0$. From this it is seen that the shields described in connection with FIGURE 3 and the insulation of the control and gate wires should be as thin as possible if great differences in size between control and gate conductors are to be avoided.

For a niobium control conductor and a lead gate wire, the ratio $$\frac{H_c^*}{H_g^*}$$

at 4.2° K. is approximately $$\frac{1500 \text{ oersteds}}{550 \text{ oersteds}} = 3$$

Therefore, in the limiting case for these materials:

$$r_c > \frac{x + t_g}{2}$$

and $$t_g < 2 r_c - x$$

Multiplying the left-hand side of the first inequality by the factor 10 previously mentioned provides:

$$t_g < .2 r_c - .1x$$

Because of the great difference in quenching fields, the relative sizes of a niobium control wire and a tantalum gate wire are not as critical as the combinations of materials just described.

Thus, from FIGURE 1, $$\frac{H_c^*}{H^*} = \frac{1500 \text{ oersteds}}{100 \text{ oersteds}} = 15$$

for niobium and tantalum at 4.2° K., and, in the limiting case $$r_c > \frac{x + t_g}{14}$$

or $$t_g < 14 r_c - x$$

Utilizing the same factor of 10 to insure quenching of a substantial portion of the gate wire and to account for insulation thickness between the control and gate wires, $$t_g < 1.4 r_c - .1x$$

For these calculations it is apparent that the control conductor should be substantially larger than the gate conductor when the ratio of their quenching fields is relatively small. It should be noted that, while we have suggested a factor of 10 as being desirable to insure quenching of a substantial portion of the conductor, this value is chosen by way of example only. In some instances, satisfactory operation may be achieved with smaller or larger values, and these calculations are intended to suggest primary orders of magnitude and not actual values.

The magnetic shields shown in FIGURE 3 may be of either diamagnetic or paramagnetic material. The flux pattern for a diamagnetic shield is shown in FIGURE 5. Preferably, the shield is made of a thin sheet or plate of material such as niobium or other material which is superconductive at the temperature of operation of the memory and requires a strong quenching field. A magnetic field cannot exist within a superconductor, and, therefore, any magnetic field at its surface must be parallel thereto. Thus, in FIGURE 5, the flux lines in the liquid helium surrounding a current-carrying conductor must all be tangential to the surface of the superconductive shield. Any component of field which is normal to the surface of the shield will cause circulating currents to be set up in the shield; these currents are in such a direction that the field associated with them completely cancels the normal field. Thus, the gate conductor is completely shielded from the field generated by the control conductor immediately below it, and, as a result, the flux generated by the field associated with the control conductor follows approximately the path shown in FIGURE 5. None passes through the diamagnetic shield to quench the gate conductor immediately below it. The thickness of the shield of FIGURE 5 has been exaggerated for purposes of illustration. In practice, it may be substantially thinner than either the control or gate conductor, and, as previously explained, should be made as thin as possible to minimize the required difference in size of the control and gate conductor when a superconductive control conductor is used.

FIGURE 6 illustrates a paramagnetic shield which performs a shielding function similar to the diamagnetic shield of FIGURE 5. However, the paramagnetic shield performs this function in an almost directly opposite manner from the diamagnetic shield which has zero permeability and thus blocks the flux from the control conductor. The permeability of the paramagnetic material, which may be soft iron or the like, is high compared to that of the liquid helium bath in which the superconductor is located, and thus the shield effectively "short circuits" the magnetic flux of the control conductor. The flux generated by the magnetic field associated with the control conductor will pass through this shield in preference to passing through the surrounding liquid helium. Although the total density of the flux generated by the field around the wire is higher with the high reluctance paramagnetic shield, the lines of flux are concentrated in the shield, leaving the gate conductor above the shield in an area of comparatively low flux density.

The required thickness of the paramagnetic shield depends upon its saturation level. It should be thick enough to stay below the saturation level while carrying the required flux. If saturation is reached, the permeability of the shield to flux above the saturation level will be substantially decreased, thereby impairing its shielding effect.

Both the paramagnetic and diamagnetic shields should extend somewhat beyond the junction of the control and gate wires; if the shield width as seen in FIGURE 3 is approximately five times the width of the control conductor, and the length is approximately five times the width of the gate conductor, the shield will be sufficiently large to be effective. The actual shield area is a matter of design in each case and can be varied depending upon current carried by the control conductors, etc.

A multiple gate switch, such as is described in the copending application of Dudley A. Buck entitled "Multiple Gate Cryotron Switch," filed February 19, 1957, Serial No. 640,656, may also be made utilizing the construction of our invention. Such a switch may have a construction similar to that of FIGURE 3. The common input point 62 shown therein may be connected to the signal source which is to be switched; the other ends of the gate conductors are connected to the circuit to which the common input is to be switched. With three control stations it is possible to switch this common input to any one of eight outputs. Thus, a total of eight gate conductors similar to conductors 30, 32, 34 and 36 may be provided, and the shielding between these gate conductors and the three pairs of control conductors will then be such that any combination of energization of the control conductors through switches 24, 26 and 28 will quench all the gate conductors but one. This one superconductive gate conductor will then carry all the current flowing to the common point 62 from this point to the circuit to which the superconductive gate conductor is connected. By energizing different control wires, a different gate conductor can be selected. With a switch having "$n$" control stations, it is possible to select one out of $2^n$ different gate conductors.

In FIGURE 7 we have illustrated a structure which may be used for supporting the elements shown in FIGURE 3. As shown therein, each group of elements, i.e., the control conductors, the gate conductors and the magnetic shields are, respectively, affixed to or embedded in thin sheets or layers of plastic material. Thus, the control conductors 6, 8, 10, 12, 14 and 16 may be arranged in three pairs and embedded in the lower plastic sheet 70. The gate conductors 30, 32, 34 and 36 are here illustrated as circular wires embedded in the upper sheet 72, while the shields are shown embedded in the sheet 74 therebetween.

In manufacture, the various similar elements may be secured to the respective plastic sheets, and the sheets may then be assembled in the sandwich fashion shown. Preferably, the sheet 72 carrying the gate wires is oriented so that the gate conductors cross the control conductors at right angles thereto. The shields of paramagnetic or diamagnetic material in sheet 74 must be properly positioned relative to each other to prevent quenching at undesired junctions in the assembled device.

A material which has many desirable properties for these sheets is polyethylene terephthalate, a polymer formed by a condensation reaction of ethylene glycol and terephthalic acid. This stable, inert thermoplastic material is supplied by the Polychemicals Division of the E. I. du Pont de Nemours Company under the trademark "Mylar." The sheets should be as thin as possible, consistent with their function of providing support and electrical insulation for the various conductors.

Although the sheets 70, 72 and 74 are shown spaced from each other in FIGURE 7, this is for illustrative purposes only, and, in practice, they may be sealed together either by heat and pressure or by cements to form a unitary element. Such a construction can readily be utilized to manufacture memories or switches having a million or more gate conductors, since the selection of the conductors is determined by the shield location, and these are separately formed according to a regular pattern. In practice, with devices having large numbers of gate wires, it is desirable to stack a plurality of sandwiches of the type illustrated. With this construction, corresponding control conductors of each sandwich are connected in series if they are superconductive. If non-superconductive control conductors are utilized, they may be connected in either series or parallel. From the construction illustrated in FIGURE 7, it is also apparent that the information stored in a memory may be readily changed by substituting a shield sheet 74 having one pattern thereon for another having the shields arranged in a different pattern. For this construction, the three sheets would not be formed into a unitary structure, but the sheets carrying the control conductors and the gate conductors would be separately supported so that the shield sheet can readily be inserted between them. To provide a memory having the maximum possible storage capacity, $2^n$ gate conductors may be provided for an "$n$" control station device having two control conductors per station. Undesired conductors can be omitted for the memory by not shielding them from any control conductors at any one station. In this fashion, not only the "word" stored in the memory but its capacity may be varied.

Turning now to FIGURE 8, we have illustrated a translator embodying another form of our invention. This translator is best understood by considering the simple translation which it is designed to perform. As shown in Table I (below), each of the letters of the alphabet is assigned a particular binary "word," five binary digits being required to encode all twenty-six letters. Table II illustrates the desired translation. For each letter of the alphabet read into the read-in equipment generally indicated at 76 (the left column in Table II), it is desired to obtain another letter at the read-out equipment generally indicated at 78 (the right column of Table II).

Table I

| | |
|---|---|
| 00001 | A |
| 00010 | B |
| 00011 | C |
| 00100 | D |
| 00101 | E |
| 00110 | F |
| 00111 | G |
| 01000 | H |
| 01001 | I |
| 01010 | J |
| 01011 | K |
| 01100 | L |
| 01101 | M |
| 01110 | N |
| 01111 | O |
| 10000 | P |
| 10001 | Q |
| 10010 | R |
| 10011 | S |
| 10100 | T |
| 10101 | U |
| 10110 | V |
| 10111 | W |
| 11000 | X |
| 11001 | Y |
| 11010 | Z |
| 11100 | |

Table II

| Input Letter | Output Letter |
|---|---|
| A | Z |
| B | A |
| C | Y |
| D | B |
| E | X |
| F | C |
| G | W |
| H | D |
| I | V |
| J | E |
| K | U |
| L | F |
| M | T |
| N | G |
| O | S |
| P | H |
| Q | R |
| R | I |
| S | Q |
| T | J |
| U | P |
| V | K |
| W | O |
| X | L |
| Y | N |
| Z | M |

The translator shown in FIGURE 8 utilizes a prewired memory having input and output sections generally indicated at 80 and 82. Many of the required letter wires have been omitted from the figure for purposes of clarity. The input section 80 of the translator of FIGURE 8 is similar in construction to the memory of FIGURE 3 previously described. Thus, a plurality of control stations, in this case five, are provided, each having a pair of control conductors 84, 86, 88, 90, 92, 94, 96, 98, 102 and 103. The non-energized ends of the control conductors are connected to a common point 104 by a superconductive wire 106 and from there returned to ground. The ONE wires in each control station of the input section are, respectively, 86, 90, 94, 98 and 103, while the ZERO control wires are the wires 84, 88, 92, 96 and 102. Gate wires 114, 116, 118 and 120 pass over the pairs of control wires at right angles thereto just as do the gate conductors of FIGURE 3. A current source for the gate conductors is illustratively shown as a battery 109 in series with a limiting resistor 112. Magnetic shielding is provided at selected junctions of the control and gate wires by the sheet of magnetic material 122 having openings formed at appropriate points therein to permit quenching of certain of the gate conductors by current in the control conductors immediately below them. Thus, for the wire 114, which in the input section of the translator represents the letter "A," openings are provided in the sheet 122 where the gate conductor crosses the ONE conductors at the first, second, third and fourth control stations, i.e., wires 86, 90, 94 and 98, and the ZERO conductor at the last control station, i.e., wire 102. Thus, wire 114 will remain unquenched only when the control stations in the input section are energized according to the binary word 00001, which is the code for the letter "A." For any other energization of the control conductors, it will be quenched. In similar fashion, shielding is provided by the sheet 122 so that the gate wire 116 will not be quenched by the control conductors when they are energized according to the "B" code; the conductor 118 will remain unquenched when the input is energized according to the "C" code, and finally the wire 120 when the input is energized according to the "Z" code.

In the output section generally indicated at 82, the information represented by the selected letter wire is converted to the output code. As shown in FIGURE 8, this section includes a plurality of output gate wires, i.e., ZERO wires 124, 128, 132, 136 and 140, and ONE wires 126, 130, 138 and 142, arranged in pairs to form five output stations, each output station representing one binary digit. These output gate wires occupy the same relative position in the output section as the control conductors in the input section. The gate wires 114, 116, 118 and 120 now serve as control conductors and thus are preferably disposed at right angles to the output section gate conductors. A magnetic shield 144, similar to shield 122, is interposed between the input and output gate wires. Thus, quenching of an output gate conductor by current in an input gate conductor can occur only where an opening exists in the shield 144 to permit flux to pass through it.

The pairs of output gate wires are preferably energized from individual current sources generally indicated at 146, 148, 150, 152 and 154. Since for each output code one or the other of the input gate conductors in each pair is made superconductive, current from a common source will have a choice of superconductive paths through several output gate conductors. Since no one superconducting path has a lower resistance than any other, current from a common source might all flow through the first of the output gate wires to become superconductive, and it is necessary to provide separate current sources for each pair of output gate wires.

As was pointed out in the description relating to the memory of FIGURE 3, if the control wires are superconductive, the material from which they are made must require a more intense quenching field at the temperature of operation than the gate wires which they are to quench, i.e., the field required to quench the control conductors in the input section 80 should be greater than that required to quench the gate conductors 114, 116, 118 and 120, and, similarly, in the output section 82, wires 114, 116, 118 and 120 should require a more intense quenching field than the output gate wires. Thus, in a translator made according to our invention, the input control conductors should have the greatest quenching field, the input gate conductors 114, 116, 118 and 120 a quenching field of intermediate strength, and the output gate conductors the least magnetic field strength for quenching. From FIGURE 1 it is seen that the input section control conductors may be of niobium, if they are superconductive, the input gate wires 114, 116, 118 and 120 lead, and the output gate wires tantalum. Thus, in each case the current carried by the control conductor can be large enough to quench the associated gate conductors without self-quenching of the control conductor.

Furthermore, control conductors should in general be substantially larger in size than the gate wires which they control. Thus, the input section control conductors should be substantially larger than the input section gate wires 114, 116, 118 and 120. Using the criteria previously given for niobium-lead and lead-tantalum at 4.2° K., and assuming that the spacing between the control and gate conductors is sufficiently small so that it is negligible, the ratio of gate wire or ribbon thickness to that of the control wire is preferably not more than ⅓ where niobium is used for the control conductors and lead for the gate conductors. Similarly, the ratio of gate conductor thickness to that of the output gate conductors should not be more than about ½ if tantalum is used for the output gate wires. Thus, the conductors are in descending order of both thickness and quenching field strength in going from control conductor to gate conductor to output gate conductor.

The sheet of shielding material may be of either paramagnetic or diamagnetic material, e.g., superconductive. If the control conductors in the input section are superconductive, then such a diamagnetic shield should have a quenching field which is higher than that of the control conductor. Thus, if the superconductive shield is of niobium, the control conductors might be of lead, the gate conductors of tantalum, and the output gate conductors of tin; this will require a temperature of operation of approximately 3.5° K., which is below the transition temperature for tin. The shields should be as thin a possible, as previously described.

The control, gate and output conductors may be supported in any convenient fashion, such as in sheets of plastic, as described in connection with FIGURE 7. In such a construction, the sheets of magnetic shielding material 122 and 144 may be sandwiched between two plastic sheets, one carrying control conductors and output gate conductors, and the other carrying the input gate conductors. The two separate sheet of shielding material might also be combined into a single sheet if desired.

It is to be understood that the continuous sheet type shields shown in FIGURE 8 may be used with other multiple gate devices such as the memory of FIGURE 3 or the multiple gate switch previously described. It is also apparent that, if the sheets containing the control, gate and output gate conductors are separately supported, the translation may be readily changed by removing the shield sheet 122 or 144 and substituting one having a different pattern of openings formed therein. Sheild sheets such as those described in connection with FIGURE 7 might also be utilized in place of the full sheets of magnetic material described in connection with FIGURE 8.

The operation of the translator of FIGURE 8 can best be understood by considering that a particular letter, e.g., "A," is fed to the input of the translator. As previously explained, the "A" gate wire 114 will remain superconductive, but all other gate wires in the translator will be quenched by one or another of the control conductors. Thus, wire 114 will carry all the current from the battery 109. The magnetic field generated by the current in wire 114 quenches conductors 124, 128, 132, 138 and 142. Thus, wires 126, 130, 134, 136 and 140 remain superconductive, and each carries all the current from its corresponding source to the read-out equipment generally indicated at 78. If the left-hand wire in each pair of output gate wires is labeled the ZERO wire and the right-hand wire the ONE wire, it is evident that the current-carrying wires are those corresponding to 11100, the output code for "Z." From Table II it is seen that this is the letter to which "A" was to be translated. Appropriate read-out equipment can be used to convert this digitally coded letter into a typed character or other appropriate form, or it may be used in other places in the equipment in its coded form.

The other letters are translated in the same manner, the "B" wire 116 quenching the 11110 wires to provide a 00001 output representing "A," etc. In this fashion, a unique translation between input and output is accomplished utilizing a relatively simple construction.

By extending the number of control stations in the input and output sections, entire words rather than individual letters can be translated; thus, a translator of this type might be used for English-Russian or English-German translation.

A major advantage of a translator made according to our invention is its high speed of operation, since all output digits appear simultaneously. With translators of this type, it is possible to translate from one set of digits to another in a few microseconds, and this speed is independent of the number of digits to be translated.

In FIGURE 9 we have illustrated another arrangement in which the quenching effect of control conductor current may be avoided at a gate conductor-control conductor crossover. Illustratively, a control conductor 160 and gate conductor 162, formed of suitable material as described above, are separated by sheet 164 of insulating material. As thus constructed, the illustrated crossover provides quenching of gate conductor 162 by the magnetic field resulting from current through control conductor 160. In order to maintain a superconductive path along the gate conductor 162 when the control conductor is energized, we provide a superconductive tab 166 bridging quenched portion 162a and in electrical contact with conductor 162 on both sides of said portion. Thus, although conductor 162 is quenched by current through conductor 160, tab 166 provides a superconductive shunt around portion 162a, and a superconductive path is maintained along the gate conductor at the crossover.

Tab 166 is of a material which, like the diamagnetic shield of FIGURE 5, remains superconductive when quenching currents are passed through the control conductors. Thus, where a tantalum or lead gate conductor is used, the bridging tab may be of niobium. The tabs may be applied in any suitable manner. However, when they are used in devices such as switches, memories or translators having large numbers of crossovers, we prefer evaporating the tab material through a mask, directly onto the gate conductors. In this way, all the tabs can be applied quickly and efficiently in a single operation. They may have any desirable shapes and positions on the gate conductors, so long as they make electrical contact on both sides of the quenched portions they are to bridge. Preferably, as shown in FIGURE 9, they are disposed oppositely from the control conductors to minimize the control fields reaching the tabs and maximize the fields reaching the gate conductors. While FIGURE 9 illustrates a single gate conductor-control conductor crossover, it will be apparent how such crossovers may be utilized in place of the magnetic shields in the devices described above.

It may be desirable in certain cases to use tabs 166 having different quenching characteristics. Thus, a memory may have a plurality of crossovers with niobium tabs and further crossovers with lead tabs bridging quenched portions of tantalum gate conductors. With the control conductors energized with sufficient current to quench only the tantalum conductors, all the tabs will bridge the quenched portions associated therewith. If the control currents are increased to the level necessary for lead quenching, only the niobium tabs will remain superconductive, and the content of the memory will be altered accordingly. This principle may also be applied to the superconductive magnetic shields described above. Further, it will be apparent that the same operation may be effected by using ferromagnetic shields with different saturation levels. The latter shields might vary in thickness or material to provide the desired characteristics.

From the above discussion of relative conductor sizes, it will be seen that, as the size of a control conductor is increased, the magnetic field at its surface becomes weaker for a given current. Furthermore, the field at a given distance from the surface of the conductor also becomes weaker. Thus, by making a control conductor sufficiently large at a crossover, quenching of the gate conductor thereat may be avoided. A logical array of quenching and non-quenching crossovers forming switches, memories or translators of the types described above may be formed by varying the size of each control conductor to be relatively small at crossovers where quenching is desired and relatively large where it is not desired. The minimum size of the control conductors is, of course, dictated by the requirements set forth above. However, with the thinness of the gate conductors and the insulation separating gate conductors from control conductors described below, this problem does not require exaggerated control conductor size.

Thus, a logical crossover array may be formed without the use of magnetic shielding devices. A portion of an array of this type is shown in FIGURE 10, in which a control conductor 170 extends through crossovers generally indicated at 172 and 174. In the crossovers, the control conductor 170 passes close to gate conductors 176 and 178. The control conductor has a reduced portion 170a in the crossover 174 and an enlarged portion 170b in the crossover 172.

Current in the conductor 170 spreads out over the width thereof, and, therefore, the magnetic field developed around the enlarged portion 170b is less than that surrounding the reduced portion 170a. Accordingly, if the current is set at a level which will just quench the gate conductor 178 in the crossover 174, there will be no quenching of the gate conductor 176 in the crossover 172.

The embodiment of FIGURE 10 may be readily constructed by use of vacuum deposition techniques in which the various conductors are deposited on a substrate through masks having appropriately disposed apertures. Thus, as seen in FIGURE 11, the gate conductors 176 and 178 are first evaporated onto a substrate 180 of insulating material such as glass. Next, an insulating layer 182, which may be of silicon monoxide, is deposited over the gate conductors. Finally, the control conductor 170 is deposited.

Illustratively, the thickness of the gate and control conductors in FIGURES 10 and 11 may be on the order of 3000 Angstrom units. They may be made much thinner if such construction is practical in a given case. The insulating layer 182 may have the same thickness. The gate conductors may have a width of 0.05 in., wide enough to prevent self-quenching when they are in series with control conductors which are 0.005 in. wide at quenching crossovers. In non-quenching crossovers, the control conductors may be 0.025–0.050 in. wide.

It will be apparent that the embodiments of FIGURES 1–9 may also be constructed in the form of thin films in the manner suggested in FIGURE 11. The particular form of construction and the embodiment used in a given case will depend on such factors as the particular circuit to be fabricated, the size of the circuit and the number of circuits of a given type to be made.

Thus, we have provided a simple construction for multiple gate devices utilizing cryotron principles. In one form, our construction permits selection of one gate conductor from a plurality of gates by inserting at appropriate junctions of gate and control conductors magnetic shields which prevent quenching of the gate conductors by currents in the control conductor. These magnetic shields may be of either paramagnetic or diamagnetic material, a diamagnetic shield being provided by utilizing material which is superconductive at the temperature of operation of the device. The shields may be in the form of individual pieces inserted between appropriate junctions, or they may be formed from a unitary sheet of magnetic material with openings formed therein at crossings of control and gate wires where quenching is to be permitted. We have also disclosed a simple construction for such devices wherein the control and gate wires are embedded in individual sheets of plastic; a shield sheet, either of magnetic material having openings therein as described, or with individual magnetic shields embedded in it, is inserted between the control and gate conductor sheets. We have also provided a prewired memory, a multiple gate switch and a translator, all operating on cryotron principles and utilizing the improved construction of our invention.

In another form, our invention uses control conductors whose widths vary according to whether or not quenching is desired at a gate conductor-control conductor crossover.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

We claim:

1. A data processing device comprising, in combination, a plurality of control stations, each of said control stations including a control conductor, a plurality of gate conductors, said gate conductors being superconductive at the temperature of operation of said device in the absence of an applied magnetic field, and each of said gate conductors being in close proximity to at least one of said control conductors, whereby said gate conductors are caused to transfer between the superconductive and resistive states under the influence of the magnetic fields resulting from currents carried by said control conductors, and means for shielding selected gate conductors from the influence of the magnetic field of selected control conductors, said shielding means being arranged so that no more than one gate conductor remains in the superconductive state when one control conductor at each of said control stations is energized.

2. The combination defined in claim 1 in which said control conductors are superconductive and are made of a material requiring a higher magnetic field to cause transfer from a superconductive to a resistive state than is required for said gate conductors at the temperature of operation of said device.

3. The combination defined in claim 1 in which the ratio of the thickness of said gate conductors to the thickness of said control conductors is no greater than 1.

4. The combination defined in claim 1 in which said shielding means includes a sheet of magnetic material interposed between a control conductor and a gate conductor.

5. The combination defined in claim 4 in which said magnetic material is paramagnetic.

6. The combination defined in claim 4 in which said magnetic material is diamagnetic.

7. The combination defined in claim 6 in which said diamagnetic sheet is a material which is superconductive at the temperature of operation of said device and remains superconductive throughout the operation thereof.

8. A data processing device comprising, in combination, a plurality of control stations, each of said control stations including a control conductor, a plurality of gate conductors, said gate conductors and said control conductors being superconductive at the temperature of operation of said device in the absence of a magnetic field, each of said gate conductors being in close proximity to at least one of said control conductors, whereby said gate conductors are caused to transfer between superconductive and resistive states under the influence of magnetic fields resulting from currents carried by said control conductors, said control conductors being made of a material requiring a higher magnetic field to cause transfer from a superconductive to a resistive state than is required by the material of said gate conductors at the temperature of operation of said device, the ratio of the thickness of said gate conductor to that of said control conductor being no greater than 1, and means for shielding selected gate conductors from the influence of the magnetic field associated with selected control conductors, said shielding means including a sheet of magnetic material inserted between a control conductor and a gate conductor, said shielding means being arranged so that no more than one gate conductor remains in the superconductive state when one control conductor at each of said control stations is energized.

9. The combination defined in claim 8 in which said magnetic material is paramagnetic.

10. The combination defined in claim 8 in which said magnetic material is diamagnetic.

11. The combination defined in claim 10 in which said diamagnetic material is a material which is superconductive at the temperature of operation of said device.

12. A prewired memory comprising, in combination, a plurality of control stations, each of said control stations including at least one control conductor, a plurality of gate conductors, said gate conductors being superconductive at the temperature of operation of said device in the absence of an applied magnetic field, and each of said gate conductors being in close proximity to at least one of said control conductors, whereby said gate conductors transfer between superconductive and resistive states under the influence of changes in the magnetic fields resulting from currents carried by said control conductors, said gate conductors being superconductively connected to a common point at each end of said memory, means for shielding said gate conductors from the influence of the magnetic field associated with selected control conductors, said shielding means being arranged so that no more than one gate conductor remains in the superconductive state when one control conductor at each of said control stations is energized, a source of electric current connected across said common points, and means for determining the conductive state of said memory between said common points.

13. The combination defined in claim 12 in which said control conductors are superconductive and are made of a material requiring a higher magnetic field to cause transfer from a superconductive to a resistive state than is required for said gate conductors at the temperature of operation of said device.

14. The combination defined in claim 12 in which the ratio of the thickness of said gate conductors to the thickness of said control conductors is no greater than 1.

15. The combination defined in claim 12 in which said shielding means includes a sheet of magnetic material interposed between a control conductor and a gate conductor.

16. The combination defined in claim 15 in which said magnetic material is diamagnetic.

17. The combination defined in claim 15 in which said magnetic material is paramagnetic.

18. A multiple gate switch comprising, in combination, a plurality of control stations, each of said control stations including a control conductor, a plurality of gate conductors, said gate conductors being superconductive at the temperature of operation of said device in the absence of an applied magnetic field, and each of said gate conductors being in close proximity to at least one of said control conductors, whereby said gate conductors are caused to transfer between the superconductive and resistive states under the influence of changes in the magnetic fields resulting from currents carried by said control conductors, each of said gate conductors being superconductively connected to a common input point which is to be switched, and means for shielding selected gate conductors from the influence of the magnetic field associated with selected control conductors, said shielding means being arranged so that no more than one gate conductor remains in the superconductive state when one control conductor at each of said control stations is energized.

19. The combination defined in claim 18 in which said shielding means includes a sheet of magnetic material interposed between a control conductor and a gate conductor.

20. The combination defined in claim 19 in which said magnetic material is paramagnetic.

21. The combination defined in claim 19 in which said magnetic material is diamagnetic.

22. A translator comprising, in combination, an input section and an output section, said input section comprising a plurality of control stations, each of said control stations including at least one control conductor, a plurality of gate conductors, said gate conductors being superconductive at the temperature of operation of said device in the absence of an applied magnetic field, and each of said gate conductors being in close proximity to at least one of said control conductors, whereby said gate conductors are caused to transfer between a superconductive and a resistive state under the influence of changes in the magnetic fields resulting from currents carried by control conductors in close proximity thereto, means for shielding selected gate conductors from the influence of the magnetic fields of selected gate conductors, said shielding means being arranged so that no more than one gate conductor remains in the superconductive state when one control conductor at each of said input section control stations is energized, said input section gate conductors being superconductively connected together at one end, and means for supplying current to said common connection; and said output section comprising a plurality of read-out stations, each of said read-out stations including an output gate conductor, said output gate conductors being superconductive at the temperature of operation of said device in the absence of an applied magnetic field, said input section gate conductors being in close proximity to each of said output section gate conductors, whereby said output section gate conductors are caused to transfer between the superconductive and the resistive state under the influence of changes in the magnetic field resulting from current carried by said input section gate conductors, and means for shielding at least one of said output section gate conductors at each of said read-out stations from the magnetic field associated with each of said input section gate conductors passing in close proximity thereto.

23. The apparatus defined in claim 22 in which said control conductors are superconductive and of a material requiring a higher magnetic field to cause transfer from a superconductive to a resistive state than is required for the material of which said input gate conductors are made at the temperature of operation of said device.

24. The apparatus defined in claim 22 in which said input gate conductors are of a material requiring a higher magnetic field to cause transfer from a superconductive to a resistive state than is required for the material of which said output gate conductors are made at the temperature of operation of said device.

25. The apparatus defined in claim 22 in which said control conductors are superconductive and are made of a material requiring a higher magnetic field to cause transfer from a superconductive to a resistive state than is required by said input gate conductors, and said input gate conductors are of a material requiring a higher magnetic field to cause transfer from a superconductive state than is required by the material of said output gate conductors at the temperature of operation of said device.

26. The apparatus defined in claim 22 in which the ratio of the thickness of said input gate conductors to that of said control conductors is not greater than 1.

27. The apparatus defined in claim 22 in which the ratio of the thickness of said output gate conductors to that of said input gate conductors is no greater than 1.

28. The apparatus defined in claim 22 in which the ratio of the thickness of said input gate conductors to that of said control conductors is no greater than 1, and the ratio of the thickness of said output gate conductors to that of said input gate conductors is also no greater than 1.

29. The apparatus defined in claim 25 in which the ratio of the thickness of said input gate conductors to that of said control conductors is no greater than 1, and the ratio of the thickness of said output gate conductors to that of said input gate conductors is also no greater than 1.

30. The apparatus defined in claim 22 in which said shielding means in said input and output sections includes sheets of magnetic material interposed respectively between said control conductors and said input gate conductors and between said input gate conductors and said output gate conductors.

31. A data processing device comprising, in combination, a plurality of control stations, each of said control stations including a control conductor, a plurality of gate conductors, said gate conductors being superconductive at the temperature of operation of said device in the absence of an applied magnetic field, and each of said gate conductors being in close proximity to at least one of said control conductors, whereby said gate conductors are caused to transfer between the superconductive and resistive states under the influence of changes in the magnetic fields resulting from currents carried by control conductors in close proximity thereto, and means for shielding selected gate conductors from the influence of the magnetic field associated with selected control conductors, said shielding means including a plurality of sheets of magnetic material inserted between said selected gate conductors and control conductors, said control conductors being supported by a first sheet of electrically insulating material, said gate conductors by a second sheet of electrically insulating material, and said sheets of magnetic material by a third sheet of electrically insulating material, said third sheet being disposed between said first and second sheets, and said sheets of magnetic material being located thereon in such manner that no more than one gate conductor remains superconductive when one control conductor at each of said control stations is energized.

32. A data processing device comprising, in combination, a plurality of control stations, each of said control stations including a control conductor, a plurality of gate conductors, said gate conductors being superconductive at the temperature of operation of said device in the absence of an applied magnetic field, and each of said gate conductors being in close proximity to at least one of said control conductors, whereby said gate conductors are caused to transfer between the superconductive and resistive states under the influence of changes in magnetic fields resulting from currents carried by control conductors in close proximity thereto, and means for shielding selected gate conductors from the influence of the magnetic field associated with selected control conductors, said shielding means including a sheet of magnetic material having openings formed therein, said openings being formed at such locations that no more than one gate conductor remains in the superconductive state when one control conductor at each of said control stations is energized, said sheet of magnetic material being located between said control and gate conductors.

33. A data processing device comprising, in combination, a plurality of control stations, each of said control stations including a control conductor, a plurality of gate conductors, said gate conductors being superconductive at the temperature of operation of said device in the absence of an applied magnetic field, and each of said gate conductors being in close proximity to at least one of said control conductors, whereby said gate conductors are caused to transfer between the superconductive and resistive states under the influence of the magnetic fields resulting from currents carried by said control conductors, and means external of said gate conductors for rendering selected gate conductors insensitive to the influence of magnetic fields of selected control conductors, each of said means being a barrier preventing the magnetic field of the control conductor in close proximity thereto from extending therethrough outwardly from said close control conductor, said means being arranged so that no more than one gate conductor provides a superconductive path from an end thereof to the other end when one control conductor at each of said control stations is energized.

34. The combination defined in claim 33 in which portions of said gate conductors are rendered resistive by said magnetic fields and in which said means are superconductive shunts connected across selected resistive portions, thereby maintaining superconductive paths around said resistive portions in the presence of said magnetic fields.

35. A gate conductor-control conductor crossover for use in data processing device, said gate conductor being superconductive at the temperature of operation of said device in the absence of an applied magnetic field and said control conductor being in close proximity to said gate conductor, whereby a portion of said gate conductor may be made to transfer between superconductive and resistive states under the influence of a magnetic field resulting from current carried by said control conductor, said crossover comprising the combination with said gate conductor and control conductor of a superconductive shunt around said portion and electrically connected to said gate conductor on both sides of said portion, said shunt being of a material having a higher quenching field at said temperature of operation than said portion of said gate conductor, whereby a current through said control conductor rendering said portion resistive may not render said shunt resistive.

36. A prewired memory comprising, in combination, a plurality of control stations, each of said control stations including at least one control conductor, a plurality of gate conductors, said gate conductors being superconductive at the temperature of operation of said device in the absence of an applied magnetic field, and each of said gate conductors being in close proximity to at least one of said control conductors, whereby portions of said gate conductors are rendered resistive under the influence of changes in the magnetic fields resulting from currents carried by said control conductors, said gate conductors being superconductively connected to a common point at each end of said memory, means electrically connected to said gate conductors across said portions, said means being superconductive at the temperature of operation of said device and requiring a stronger magnetic field to be rendered resistive than do said gate conductors, whereby currents through said control conductors rendering said portions resistive may not render said means resistive, said means being arranged so that no more than one gate conductor has such means connected around all of its resistive portions when one control conductor at each of said control stations is energized, a source of electric current connected across said common points, and means for determining the conductive state of said memory between said common points.

37. A multiple gate switch comprising, in combination, a plurality of control stations, each of said control stations including a control conductor, a plurality of gate conductors, said gate conductors being superconductive at the temperature of operation of said device in the absence of an applied magnetic field, and each of said gate conductors being in close proximity to at least one of said control conductors, whereby a number of portions of said gate conductors are caused to transfer between the superconductive and resistive states under the influence of changes in the magnetic fields resulting from currents carried by said control conductors, one of each of said gate conductors being superconductively connected to a common input point which is to be switched, and means electrically connected to said gate conductors across selected ones of said portions, said means being of material which is superconductive at the temperature of operation of said switch in the absence of a magnetic field and requires a stronger magnetic field to be rendered resistive than do said portions of said gate conductors, thereby to provide superconductive shunts around said selected portions, said means being arranged so that no more than one gate conductor has all its resistive portions shunted when one control conductor at each of said control stations is energized.

38. A data processing device comprising, in combination, a plurality of control stations, each of said control stations including a control conductor, a plurality of gate conductors, said gate conductors being superconductive at the temperature of operation of said device in the absence of an applied magnetic field, each of said gate conductors being in close proximity to at least one of said control conductors, whereby said gate conductors are caused to transfer between the superconductive and resistive states under the influence of the magnetic fields resulting from currents carried by said control conductors, and means external of said gate conductors for rendering selected gate conductors insensitive to the influence of magnetic fields of selected control conductors, said means being arranged so that no more than one gate conductor provides a superconductive path from an end thereof to the other end when one control conductor at each of said control stations is energized.

References Cited in the file of this patent

UNITED STATES PATENTS

| | | |
|---|---|---|
| 2,877,448 | Nyberg | Mar. 10, 1959 |
| 2,962,681 | Lenty | Nov. 29, 1960 |
| 2,966,647 | Lenty | Dec. 27, 1960 |
| 2,968,794 | Slade | Jan. 17, 1961 |
| 3,015,041 | Young | Dec. 26, 1961 |

UNITED STATES PATENT OFFICE
CERTIFICATE OF CORRECTION

Patent No. 3,106,648                  October 8, 1963

Howard O. McMahon et al.

It is hereby certified that error appears in the above numbered patent requiring correction and that the said Letters Patent should read as corrected below.

Column 3, line 18, for "Swith" read -- Switch --; column 5, line 41, for "of" read -- if --; column 12, line 4, after "130," insert -- 134, --; column 13, line 14, for "sheet" read -- sheets --; column 14, line 44, for "appled" read -- applied --.

Signed and sealed this 5th day of May 1964.

(SEAL)
Attest:

ERNEST W. SWIDER                  EDWARD J. BRENNER

Attesting Officer                  Commissioner of Patents